Figure 1:
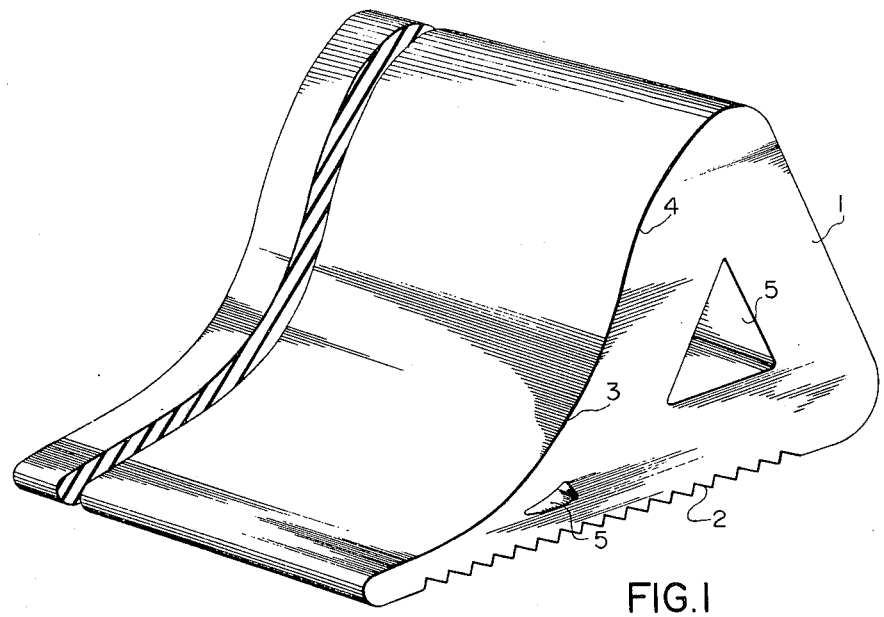

United States Patent [19]
Reed

[11] 3,993,167
[45] Nov. 23, 1976

[54] WHEEL CHOCK
[75] Inventor: Wesley Bram Reed, West Hill, Canada
[73] Assignee: Suburban Metal Industries, Ltd., Agincourt, Canada
[22] Filed: Apr. 14, 1975
[21] Appl. No.: 568,048

[30] Foreign Application Priority Data
Apr. 22, 1974 Canada .............................. 197929

[52] U.S. Cl. ................................................ 188/32
[51] Int. Cl.$^2$ ........................................... B60T 3/00
[58] Field of Search ...................................... 188/32

[56] References Cited
UNITED STATES PATENTS
2,797,774  7/1957  Eckhart ................................ 188/32
2,954,101  9/1960  Corson ................................. 188/32
3,113,642  12/1963  Lay ..................................... 188/32

*Primary Examiner*—Duane A. Reger
*Attorney, Agent, or Firm*—Ira Milton Jones

[57] ABSTRACT

The present invention provides a wheel chock for use in restraining movement of a stationary vehicle, the wheel chock comprising a solid body of resiliently flexible material, preferably rubber, having a ground engaging surface and a generally concave wheel engaging surface, which surfaces provide a tapered portion therebetween, said body having at least one aperture extending therein such that when said wheel engaging surface is engaged by said wheel of said vehicle, said material is depressed into said apertures whereby said wheel engaging surface essentially precisely follows the shape of the periphery of said wheel.

2 Claims, 2 Drawing Figures

U.S. Patent    Nov. 23, 1976    3,993,167

WHEEL CHOCK

The present invention relates to a wheel chock for use in restraining the movement of stationary vehicles such as trailers, trucks and aeroplanes.

It is a legal requirement that stationary cargo vehicles such as trucks and trailers be restrained from movement during the loading and unloading thereof by means of chocks under the wheels thereof. Chocking of the wheels allows inter alia for defective braking systems in the vehicles e.g. bleeding of the brake lines and the tendency of the vehicle to move due to reactive forces applied thereto during the loading and unloading thereof. Such chocks have heretofore been made of rigid materials such as wood and metal e.g. aluminum and welded steel and have substantial disadvantages. Typical chocks are disclosed for example in Canadian Pats. Nos. 276,267; 276,268 and 657,025. In particular it is found that such chocks do not in all cases restrain the vehicle without there being some substantial movement thereof. In particular, it is found that such chocks tend to allow some substantial movement of the vehicle to occur during the loading and unloading thereof, i.e. tend to be moved over the ground by the stationary vehicle as it is unloaded and loaded particularly when using fork-lift trucks and even more particularly when the vehicle has a faulty braking system. This condition is intolerable and causes serious accidents and sometimes death. Further, in many cases, after the vehicle has been loaded or unloaded due to an oversight of the driver's part, he may drive the vehicle away without the chocks having been removed whence the wheels will pass over the chocks. With the conventional chocks formed of rigid materials such as aluminum and steel, due to the weight of the vehicle, this will cause substantial damage to the tires of the vehicle as well as to the chocks themselves. Further, particularly with aluminum, the chocks may shatter resulting in flying metal and injury to bystanders.

The present invention provides a wheel chock for use in restraining the movement of a stationary vehicle which does not damage the tire on the wheel of the vehicle or shatter, which assumes the shape of the periphery of the wheel of the vehicle and thus provides a strong grip between the wheel and the ground whereby to avoid significant movement of the stationary vehicle as it is loaded or unloaded.

It has now been found in accordance with the present invention that by providing the wheel chock in the form of a solid block of a resiliently flexible material, particularly rubber, by providing a generally concave wheel engaging surface, preferably with a convex portion, which wheel engaging surface forms a tapered portion where it meets the ground engaging surface of the chock and by providing apertures in the body to accommodate flexible material when the body is compressed by the wheel, the chock will not shatter even under heavy loads, does not significantly move as it contacts the wheel and assumes the shape of the periphery of the wheel to provide a strong grip between the wheel and the ground.

According to the present invention therefore, there is provided a wheel chock for use in restraining movement of a stationary vehicle comprising a solid body of resiliently flexible material having a ground-engaging surface and a generally concave wheel engaging surface providing a tapered portion therebetween, said body having at least one aperture therein such that when said wheel engaging surface of said chock is engaged by the wheel of said vehicle, flexible material forming said body is depressed into said aperture whereby said wheel engaging surface essentially precisely follows the shape of the periphery of said wheel.

The wheel engaging surface of the chock of the present invention is generally concave with a tapered portion between the wheel engaging surface and the ground engaging surface. This tapered portion provides for initial gripping of the chock by the wheel as it contacts the chock and thus does not allow the chock to move as the wheel engaging surface is contacted progressively further by the wheel. The wheel engaging surface preferably has a convex portion in the generally vertical portion thereof remote from the ground-engaging surface which facilitates the assumption of the shape of the periphery of the wheel by the chock upon being compressed by the wheel, the excess material being pressed into the aperture or apertures. The ground engaging surface is suitably serrated so as to provide a good grip with the ground. The portion of the wheel engaging surface adjacent the ground engaging surface is also suitably serrated to facilitate gripping of a truck tire to hold the wheel chock before the weight of the tire makes contact with the curved surface thereof. To this end the leading edge of the chock is also suitably extended.

The apertures for accomodating the compressed flexible material when the chock is in contact with the wheel, preferably extend parallel to both the ground-engaging surface and the wheel engaging surface and preferably there is more than one such aperture. The flexible material is any material of sufficient flexibility to be deformed by the wheel of the vehicle when the body is used as a wheel chock and further has sufficient resiliency to assume substantially its initial shape when the wheel is removed from contact therewith. Rubber may be particularly mentioned in this direction, preferably a hard rubber.

Figure 2:
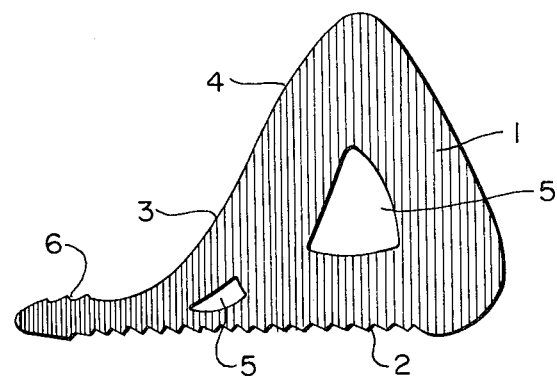

The present invention will be further illustrated by way of the accompanying drawings in which:

FIG. 1 is a perspective view of a wheel chock partially broken away according to one embodiment of the present invention, and FIG. 2 is a side elevation of a wheel chock in accordance with another embodiment of the present invention.

Referring to FIG. 1, the wheel chock takes the form of a body 1 of hard rubber having a serrated ground-engaging surface 2 and a generally concave wheel-engaging surface 3. The wheel-engaging surface 3 has a convex portion 4 in the generally vertical portion thereof and between the ground-engaging surface 1 and the wheel-engaging surface 3 there is a tapered portion which forms the leading portion of the chock upon which the wheel of the vehicle thus rides and thus traps the chock essentially immovably to the ground. Referring to FIG. 2 the upper surface of the tapered portion is serrated at 6 and extended as compared with FIG. 1 to facilitate gripping of the tire of the wheel to hold the chock in position. The wheel then rises upon the wheel-engaging surface 3 forcing excess rubber particularly from the convex portion 4 into apertures 5 which extend parallel to both the ground-engaging and wheel-engaging surfaces. By this means the wheel-engaging surface 3 assumes substantially precisely the shape of the periphery of the wheel of the vehicle and provides an excellent grip between the wheel and the ground. After the vehicle has been loaded or unloaded and if it is moved without previous removal of the chock from the wheels, the chock merely flexes under the vehicle load and then substantially assumes its initial shape and can be reused. The width of the chock may be chosen as required and the chock is suitably up to 18 inches in width.

Those skilled in the art will appreciate that the invention can be embodied in forms other than as herein disclosed for purposes of illustration.

The invention is defined by the following claims.

I claim:

1. A chock to be placed against a vehicle wheel for restraining the wheel against movement in one rolling direction, said chock having a bottom ground-engaging surface, a front surface intended to face generally towards a wheel to be engaged by the chock, a rear surface intended to face generally away from said wheel and in said rolling direction, and opposite side faces, said chock being characterized by:
   A. said chock consisting of a unitary mass of a tough and resilient material;
   B. said chock having an integral forwardly tapering lip which projects forwardly from the bottom of its front surface and onto which a wheel can readily roll to trap the lip against the ground and thereby enable the weight of the wheel to be applied to confining the chock against movement in said rolling direction;
   C. said front surface of the chock, as viewed from the sides of the chock, having
      1. an upper portion which is convexly curved,
      2. a lower concavely curved portion which merges with the upper surface of said lip, and
      3. a portion intermediate said convexly curved and said concavely curved portions that merges with them and is disposed at a large acute angle to the horizontal; and
   D. said chock having at least one aperture extending therethrough, opening to its side faces, to enable its front surface to be resiliently deformed mainly in said rolling direction under the force of a wheel tending to roll in said rolling direction, to thus cause increasing areas of the front surface to be brought into contact with the periphery of the wheel as the wheel exerts increasing force upon the chock in said rolling direction.

2. A chock as claimed in claim 1, further characterized in that said rear surface of said chock is obliquely inclined to form an acute angle with said ground engaging surface.

* * * * *